United States Patent
Okubo et al.

(10) Patent No.: US 11,685,127 B2
(45) Date of Patent: Jun. 27, 2023

(54) METHOD FOR MANUFACTURING BONDED OBJECT AND BONDED OBJECT MANUFACTURING APPARATUS

(71) Applicant: ORIGIN COMPANY, LIMITED, Saitama (JP)

(72) Inventors: Tatsuo Okubo, Saitama (JP); Takayuki Suzuki, Saitama (JP); Naoto Ozawa, Saitama (JP)

(73) Assignee: ORIGIN COMPANY, LIMITED, Saitama-shi (JP)

( * ) Notice: Subject to any disclaimer, the term of this patent is extended or adjusted under 35 U.S.C. 154(b) by 0 days.

(21) Appl. No.: 17/911,125

(22) PCT Filed: Feb. 18, 2021

(86) PCT No.: PCT/JP2021/006208
§ 371 (c)(1),
(2) Date: Sep. 12, 2022

(87) PCT Pub. No.: WO2021/199771
PCT Pub. Date: Oct. 7, 2021

(65) Prior Publication Data
US 2023/0130441 A1    Apr. 27, 2023

(30) Foreign Application Priority Data

Mar. 31, 2020    (JP) ................. 2020-062597

(51) Int. Cl.
*B29C 65/72*    (2006.01)
*B29C 65/56*    (2006.01)
(Continued)

(52) U.S. Cl.
CPC .......... *B29C 65/72* (2013.01); *B29C 65/4855* (2013.01); *B29C 65/565* (2013.01);
(Continued)

(58) Field of Classification Search
CPC ... B29C 65/72; B29C 65/4855; B29C 65/565; B29C 65/483; B29C 65/4845; B29C 66/301; B29C 66/82421; B29L 2009/00
(Continued)

(56) References Cited

U.S. PATENT DOCUMENTS

2013/0081751 A1    4/2013    Kokaji et al.
2013/0157415 A1    6/2013    Morita et al.
(Continued)

FOREIGN PATENT DOCUMENTS

JP    2013078860 A    5/2013
JP    2013-127998 A    6/2013
(Continued)

OTHER PUBLICATIONS

International Search Report dated May 11, 2021 for International Application No. PCT/JP2021/006208, with translation, 5 pages.
(Continued)

*Primary Examiner* — Philip C Tucker
*Assistant Examiner* — Brian R Slawski
(74) *Attorney, Agent, or Firm* — Squire Patton Boggs (US) LLP

(57) ABSTRACT

A bonded object manufacturing apparatus is for manufacturing a bonded object in which a first object and a second object, which is more flexible than the first object, are bonded by a bonding agent, viscosity of which is variable, and includes: a bonding agent supplier that supplies the bonding agent to a first or second bonding surfaces; a thickening unit that increases the viscosity of the bonding agent; and a loading unit that applies a load to and deforms the second object against the bonding agent that closely adheres to the first bonding surface and becomes harder than the second object. In a method for manufacturing a bonded object, the first and second bonding surfaces are brought
(Continued)

close to each other to hold the bonding agent therebetween, the bonding agent closely adheres to a required portion of the first bonding surface, and the second object is loaded and deformed against the bonding agent that closely adheres to the first bonding surface and is harder than the second object.

7 Claims, 6 Drawing Sheets

(51) Int. Cl.
 *B29C 65/48* (2006.01)
 *B29L 9/00* (2006.01)
 *B29C 65/00* (2006.01)
(52) U.S. Cl.
 CPC ........ *B29C 65/4845* (2013.01); *B29C 66/301* (2013.01); *B29C 66/82421* (2013.01); *B29L 2009/00* (2013.01)
(58) Field of Classification Search
 USPC ........ 156/60, 228, 272.2, 275.5, 275.7, 285, 156/293, 349, 379.6, 379.8, 381, 382
 See application file for complete search history.

(56) References Cited

U.S. PATENT DOCUMENTS

| | | |
|---|---|---|
| 2016/0263816 A1 | 9/2016 | Kokaji et al. |
| 2016/0361837 A1* | 12/2016 | Hayes ................... B29C 43/183 |
| 2018/0024594 A1* | 1/2018 | Park ...................... G06F 1/1613 156/60 |
| 2019/0337259 A1 | 11/2019 | Shirakami et al. |
| 2021/0245194 A1 | 8/2021 | Suzuki et al. |

FOREIGN PATENT DOCUMENTS

| | | |
|---|---|---|
| JP | 2019-184751 A | 10/2019 |
| JP | 6606239 B1 | 11/2019 |
| JP | 2020-028853 A | 2/2020 |
| WO | WO 2018/123560 A1 | 7/2018 |

OTHER PUBLICATIONS

Notice of Reasons for Refusal dated Nov. 9, 2021 for Japanese Patent Application No. 2020-062597, with English translation, 8 pages.

* cited by examiner

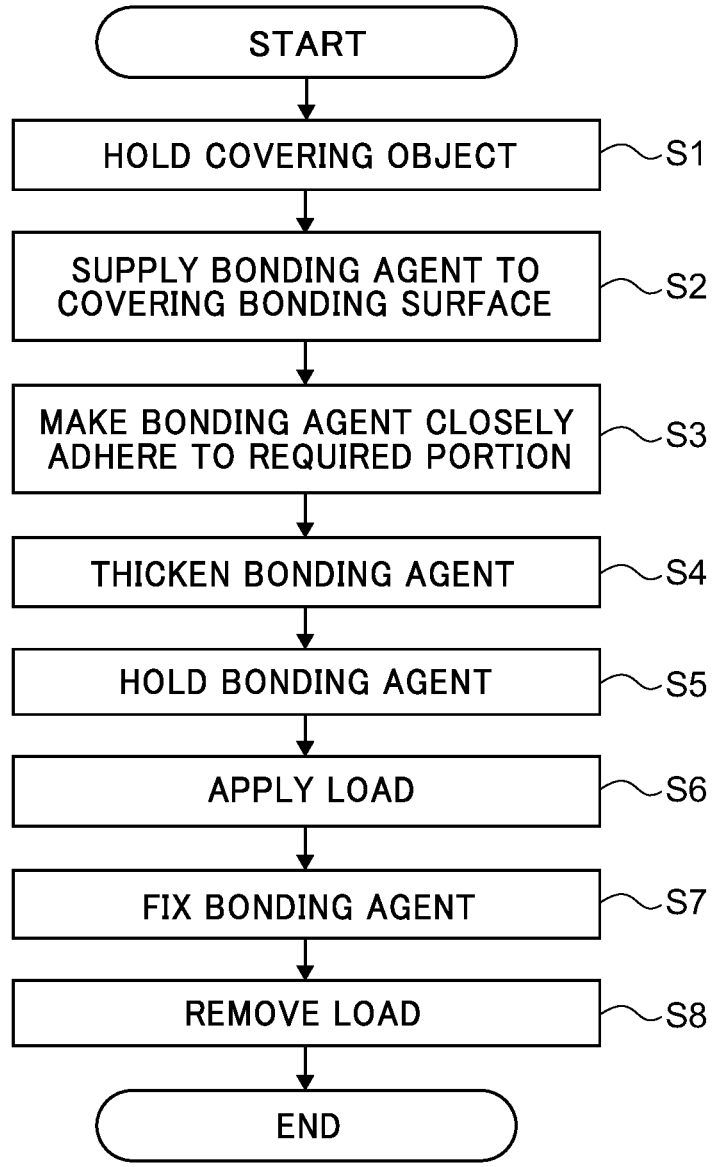

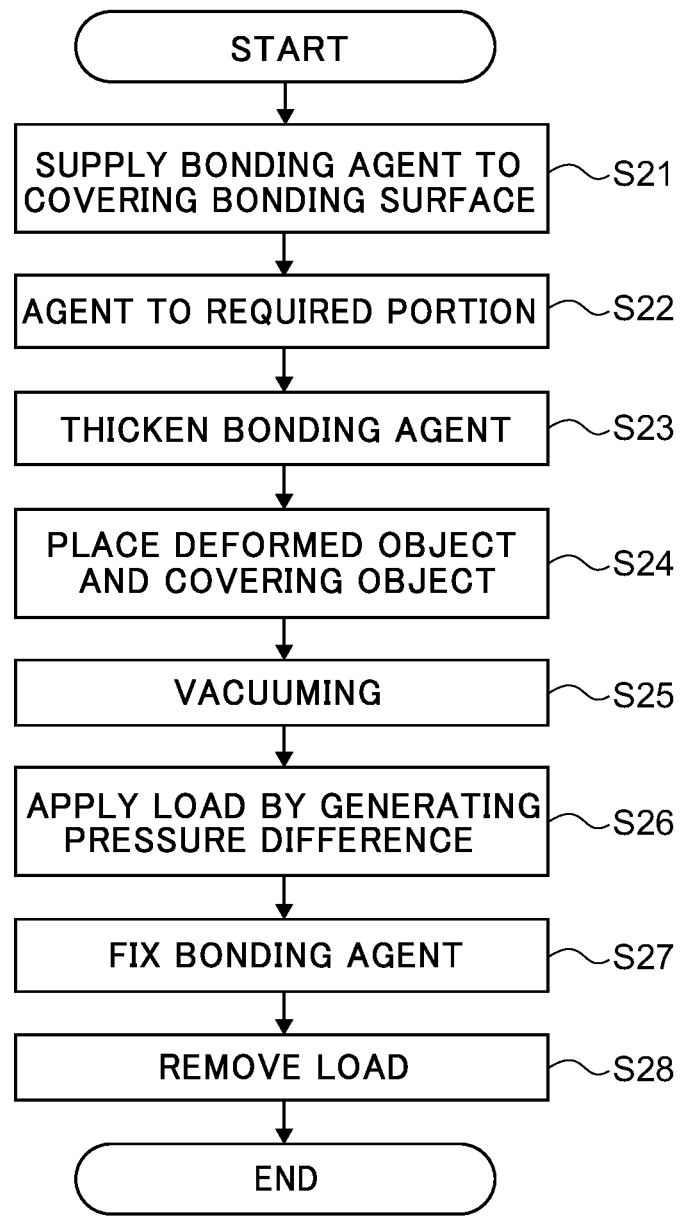

METHOD FOR MANUFACTURING BONDED OBJECT AND BONDED OBJECT MANUFACTURING APPARATUS

CROSS-REFERENCE

This application is a National Stage filing under 35 U.S.C. § 371 of International Patent Application No. PCT/JP2021/006208, filed Feb. 18, 2021, which claims the benefit of and priority to Japanese Patent Application No. 2020-062597, filed Mar. 31, 2020, the contents of all of which are hereby incorporated by reference in their entireties for all purposes.

TECHNICAL FIELD

The disclosure relates to a method for manufacturing a bonded object and a bonded object manufacturing apparatus and, in particular, to a method for manufacturing a bonded object and a bonded object manufacturing apparatus capable of appropriately bonding surfaces of objects to be bonded even when shapes of the surfaces to be bonded do not match each other.

BACKGROUND ART

For example, in a process of manufacturing a mobile device, a body board and a protective cover are bonded with an adhesive. In recent years, there has been a case where a display surface of the body board is not limited to a flat front surface but extends to end surfaces beyond outer edges of the front surface. At this time, the protective cover is also formed integrally in a manner to continuously cover an area from the flat front surface to the end surfaces beyond the rounded outer edges. A technique of bonding two objects having such curved surfaces has been available. In the technique, an application substance is supplied over a flat portion and a curved portion of the object, viscosity of the application substance on the flat portion is increased, a cover is fitted thereonto, and the application substance on the curved portion thereby fills a portion between the object and the cover while a thickness of the application substance on the flat portion is maintained (for example, see Japanese Patent No. 6606239 B).

SUMMARY OF THE INVENTION

Problem to be Solved by the Invention

In regard to a bonded object, which is manufactured by bonding the two objects, there can be a case where accuracy in thickness of an agent for bonding (hereinafter referred to as a "bonding agent"), which fills the portion between the objects, is required. In the case where it is attempted to adopt the technique disclosed in the patent document described above in such a case, the bonding agent can have the appropriate thickness when shapes of surfaces to be bonded of the two objects substantially match each other, but may not have the appropriate thickness when it is difficult to make the shapes of both of the surfaces to be bonded match each other.

In view of the above-described problem, the disclosure therefore relates to providing a method for manufacturing a bonded object and a bonded object manufacturing apparatus capable of appropriately bonding surfaces of objects to be bonded even when shapes of the surfaces to be bonded do not match each other.

Means for Solving the Problem

To achieve the above object, a method for manufacturing a bonded object according to a first aspect of the present disclosure is, as shown in FIGS. 1, 3, 4, and 6, for example, a method, wherein the bonded object E (refer to FIG. 2B, for example) includes a first object C and a second object T bonded together via a bonding agent R that is capable of changing its viscosity, the first object C having a first bonding surface Cs, the second object T having a second bonding surface Ts that is bonded to the first bonding surface Cs, the second object T being more flexible than the first object C, the bonding agent R being interposed between the first and second bonding surfaces Cs and Ts, the method including: a bonding agent supply step (S2, S12, S21) of supplying the bonding agent R to the first bonding surface Cs or the second bonding surface Ts in a manner so as to cover a required portion; a bonding agent holding step (S5, S14, S26) of bringing the first and second bonding surfaces Cs and Ts close to each other in a manner so as to hold the bonding agent R between the first and second bonding surfaces Cs and Ts; a bonding agent close adherence step (S3, S15, S22) of making the bonding agent closely adhere to the required portion of the first bonding surface Cs and Ts; and a loading step (S6, S17, S26) of applying a load to and deforming the second object T against the bonding agent R that closely adheres to the first bonding surface Cs and is harder than the second object T. In the case where the bonding agent R that has closely adhered to the required portion of the first bonding surface Cs is softer than the second object T, a thickening step (S4, S16, S23) of increasing the viscosity to make the bonding agent R harder than the second object T is preferably performed before the loading step (S6, S17, S26).

With such a configuration, even in the case where shapes of the first and second bonding surfaces do not match, it is possible to appropriately bond the first and second bonding surfaces by applying the load to and deforming the second object.

As for a method for manufacturing a bonded object according to a second aspect of the present disclosure, as shown in FIGS. 1, 3, and 6, for example, in the method according to the first aspect, the bonding agent supply step (S2, S21) includes supplying the bonding agent R to the first bonding surface Cs.

With such a configuration, it is possible to make the bonding agent closely adhere to the required portion at the same time as the supply of the bonding agent, and it is possible to avoid the manufacturing process from becoming complicated.

As for a method for manufacturing a bonded object according to a third aspect of the present disclosure, as shown in FIGS. 1, 3, 4, and 6, for example, in the method according to the first or second aspect, the method further includes a bonding agent fixing step (S7, S18, S27) of fixing the bonding agent R in a state of close adherence to the first and second bonding surfaces Cs and Ts before the load applied in the loading step (S6, S17, S26) is removed (S8, S19, S28).

With such a configuration, it is possible to keep a state where a portion between the first and second bonding surfaces is filled with the bonding agent having a desired thickness.

As for a method for manufacturing a bonded object according to a fourth aspect of the present disclosure, as shown in FIGS. 5A, 5B, and 6, for example, in the method according to any one of the first to third aspects, the method further includes a placement step (S24) of placing the first and second objects C and T in one space Sp (an existence space Sp) in which the first object C or the second object T contacts a base 21 that is as hard as or harder than the first object C, and the first and second objects C and T are not in another space Sq (a non-existence space Sq), the one space Sp being next to the other space Sq and being separated from the other space Sq via a sheet-shaped film 23, wherein the loading step (S26) includes a pressure difference generation step of increasing a pressure in the other space Sq to be higher than a pressure in the one space Sp and making the film 23 closely adhere to an adhering object A in which the base 21, the first object C, and the second object T are in contact.

With such a configuration, even in the case where the first bonding surface has the complicated shape, it is possible to appropriately bond the first and second bonding surface.

To achieve the above object, a bonded object manufacturing apparatus according to a fifth aspect of the present disclosure is, as shown in FIG. 1, for example, an apparatus 1 for manufacturing a bonded object E (refer to FIG. 2B, for example), wherein the bonded object E includes a first object C and a second object T bonded together via a bonding agent R that is capable of changing its viscosity, the first object C having a first bonding surface Cs, the second object T having a second bonding surface Ts that is bonded to the first bonding surface Cs, the second object T being more flexible than the first object C, the bonding agent R being interposed between the first and second bonding surfaces Cs and Ts, the apparatus 1 comprising: a bonding agent supplier 11 configured to supply the bonding agent R to the first bonding surface Cs or the second bonding surface Ts; a viscosity varying unit 13 configured to vary a viscosity of the bonding agent R; and a loading unit 15 configured to apply a load to and deform the second object T against the bonding agent R that closely adheres to the first bonding surface Cs and has become harder than the second object T.

With such a configuration, even in the case where shapes of the first and second bonding surfaces do not match, it is possible to appropriately bond the first and second bonding surfaces by applying the load to and deforming the second object.

Advantage of the Invention

With the present disclosure, even in the case where shapes of the first and second bonding surfaces do not match, it is possible to appropriately bond the first and second bonding surfaces by applying the load to and deforming the second object.

BRIEF DESCRIPTION OF DRAWINGS

FIG. 3 is a flowchart illustrating a manufacturing process of the method for manufacturing a bonded object according to the embodiment.

FIG. 6 is a flowchart illustrating a manufacturing process in a method for manufacturing a bonded object according to another modified example of the embodiment.

DESCRIPTION OF EMBODIMENTS

Figure 1:
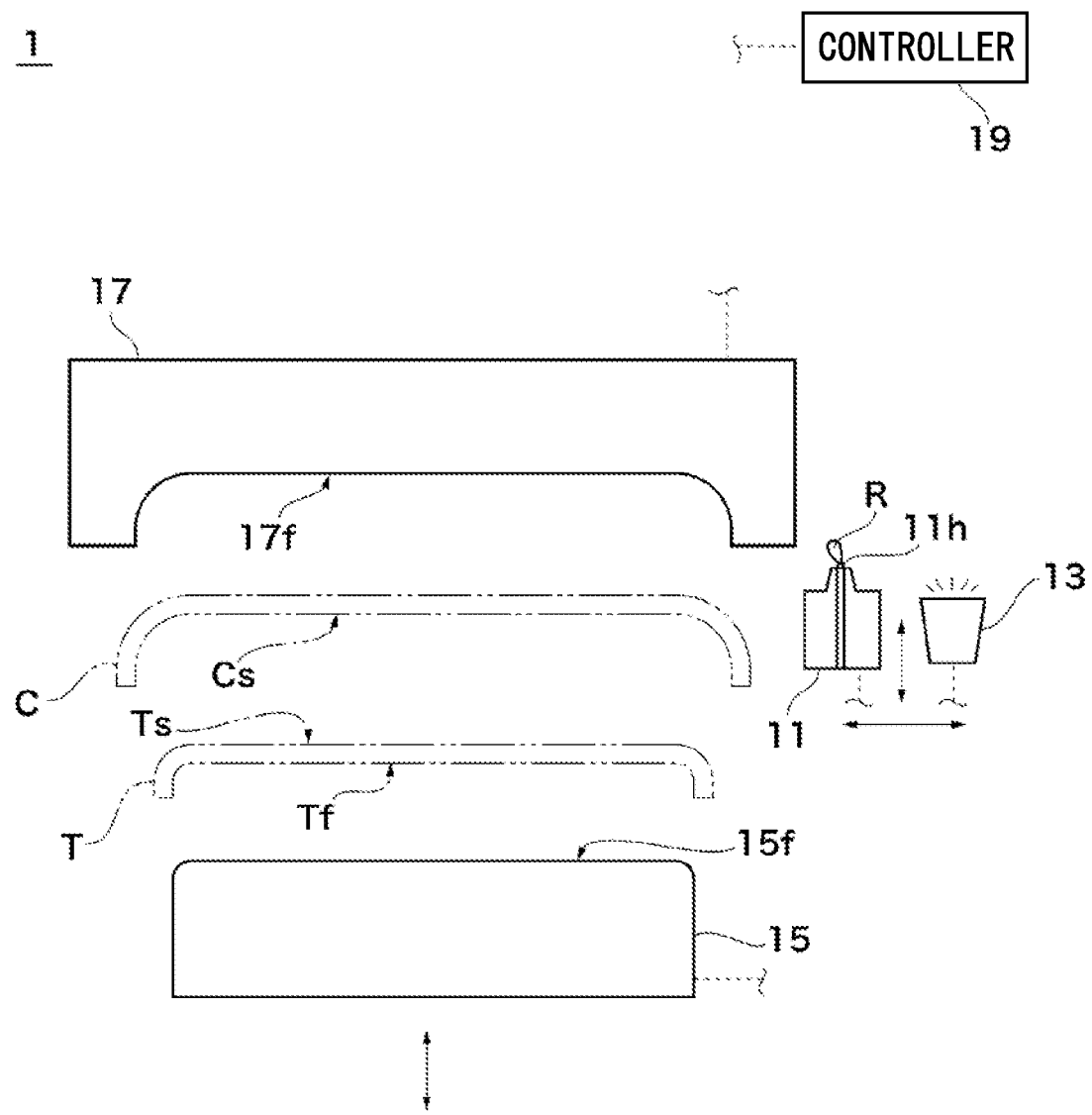
FIG. 1 is a schematic configuration view of a bonded object manufacturing apparatus according to an embodiment.

This application is based on the Patent Application No. 2020-62597 filed on Mar. 31, 2020 in Japan, the contents of which are hereby incorporated in its entirety by reference into the present application, as part thereof.

The present invention will become more fully understood from the detailed description given hereinbelow. Further range of application of the present invention will become clearer from the detailed description given hereinbelow. However, the detailed description and the specific embodiment are illustrated of desired embodiments of the present invention and are described only for the purpose of explanation. Various changes and modifications will be apparent to those ordinary skilled in the art on the basis of the detailed description.

The applicant has no intention to give to public any disclosed embodiment. Among the disclosed changes and modifications, those which may not literally fall within the scope of the patent claims constitute, therefore, a part of the present invention in the sense of doctrine of equivalents.

Description will hereinafter be made of each embodiment with reference to the drawings. The same or corresponding members are denoted with the same reference numerals in all the drawings, and their descriptions are not repeated.

First, with reference to FIG. 1, a description will be made on a bonded object manufacturing apparatus 1 according to an embodiment. FIG. 1 is a schematic configuration view of the bonded object manufacturing apparatus 1. The bonded object manufacturing apparatus 1 is an apparatus that manufactures a bonded object in which a covering object C and a deformed object T are bonded via a bonding agent R. The bonded object manufacturing apparatus 1 includes a bonding agent supplier 11 (hereinafter simply referred to as a "supplier 11") that supplies the bonding agent R, a UV irradiator 13 that emits ultraviolet rays, and a loading unit 15. In this embodiment, the bonded object manufacturing apparatus 1 further includes a holding section 17 and a controller 19. Prior to a description on the bonded object manufacturing apparatus 1, a description will herein be made on the bonded object.

Figure 2A:
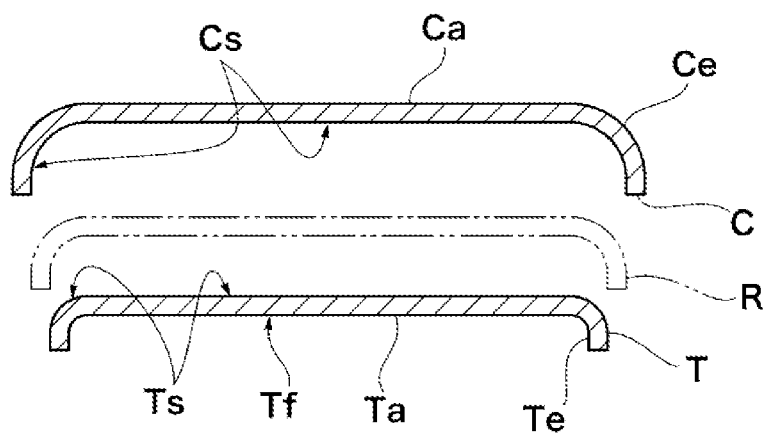
FIG. 2A is an exploded side cross-sectional view illustrating a schematic configuration of a bonded object that is manufactured by the bonded object manufacturing apparatus and a method for manufacturing a bonded object according to the embodiment.
Figure 2B:
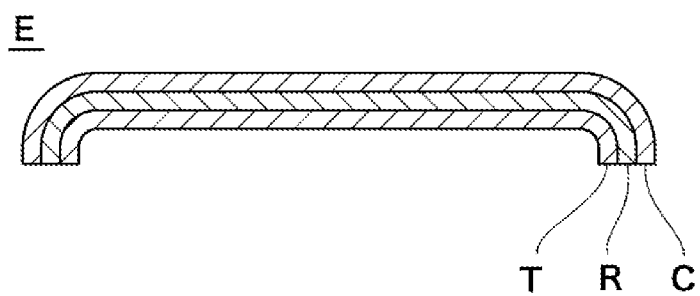
FIG. 2B is a side cross-sectional view illustrating a schematic configuration of the bonded object.

FIG. 2A is an exploded side cross-sectional view of the bonded object before the covering object C and the deformed object T are bonded to each other, and FIG. 2B is a side cross-sectional view of a bonded object E. In this embodiment, the covering object C is formed in a tray shape in which an entire outer edge of a rectangular main section (hereinafter referred to as a "covering main section Ca") is rounded and raised at one surface side. In the covering object C, a surface of a portion that is surrounded by a raised covering outer edge Ce serves as a covering bonding surface Cs to be bonded to the deformed object T. In this embodiment, the deformed object T is generally similar to the covering object C, and is formed in the tray shape that is one size smaller than the covering object C and in which an entire outer edge of a rectangular main section (hereinafter referred to as a "deformed main section Ta") is rounded and raised at one surface side. In the deformed object T, a surface on a back side of a surface of a portion that is surrounded by a raised deformed outer edge Te serves as a deformed bonding surface Ts to be bonded to the covering object C. Before being bonded to the covering object C, a radius of curvature of a rounded portion in the deformed outer edge Te of the deformed object T is larger than a radius of curvature of a rounded portion in the covering outer edge Ce. In other words, the curvature of the rounded portion in the deformed outer edge Te is smaller than the curvature of the rounded portion in the covering outer edge Ce. In addition, the deformed object T is formed to be more flexible than the covering object C. In this embodiment, the covering object C corresponds to the first object, the covering bonding surface Cs corresponds to the first bonding surface, the deformed object T corresponds to the second object, and the deformed bonding surface Ts corresponds to the second bonding surface. The bonding agent R is a substance for bonding the covering object C and the deformed object T. In this embodiment, the bonding agent R is in the form of a gel at a time point of being supplied to the covering object C or the deformed object T. In this embodiment, the bonding agent R has such a property that viscosity thereof is increased (hardness is increased) when the bonding agent R is irradiated with the ultraviolet rays. The bonding agent R becomes harder as the viscosity becomes higher (is increased), and becomes softer as the viscosity becomes lower (is reduced). During changes in the viscosity of the bonding agent R, the bonding agent R can have a state where the bonding agent R is softer than the covering object C and harder than the deformed object T, and further can have a state where the bonding agent R is softer than the deformed object T in this embodiment. In the state where the bonding agent R is softer than the deformed object T, the bonding agent R has a property of being deformable and having fluidity. As described above, shapes of the covering outer edge Ce and the deformed outer edge Te do not match each other. However, by bonding the covering object C and the deformed object T via the bonding agent R using the bonded object manufacturing apparatus 1 and/or the method for manufacturing a bonded object, which will be described below, it is possible to manufacture the bonded object E in which the covering object C and the deformed object T are bonded tightly to each other via the bonding agent R.

Referring again to FIG. 1, the description will continue on the bonded object manufacturing apparatus 1. In the following description, when configurations of the bonded object E, the covering object C, and the deformed object T are described, FIGS. 2A and 2B will appropriately be referred. The supplier 11 is a unit that supplies the bonding agent R to the covering object C or the deformed object T. In this embodiment, the supplier 11 is configured to be able to uniformly apply the bonding agent R to a required portion of the covering bonding surface Cs or the deformed bonding surface Ts. A die coater, an applicator, a bar coater, a slit coater, or the like is used therefor. The required portion is a portion that requires supply of the bonding agent R for the manufacturing of the bonded object E. The supplier 11 is configured to be movable in a parallel direction to and a direction that intersects the main sections Ca, Ta of the surfaces Cs, Ts to be supplied with the bonding agent R. The supplier 11 is connected to a bonding agent storage tank (not illustrated) that stores the bonding agent R via a tube (not illustrated), and is configured that a discharge amount (a supply amount) of the bonding agent R from the supplier 11 is controlled by changing an internal pressure of the bonding agent storage tank (not illustrated).

The UV irradiator 13 is a unit capable of increasing the viscosity of the bonding agent R by irradiating the bonding agent R with the ultraviolet rays, and corresponds to the viscosity varying unit. The UV irradiator 13 is configured to be able to adjust intensity of the emitting ultraviolet rays. In this embodiment, an area irradiated with the ultraviolet rays by the UV irradiator 13 is smaller than the covering bonding surface Cs and the deformed bonding surface Ts. However, the UV irradiator 13 is configured to be able to irradiate the entire covering bonding surface Cs or the entire deformed bonding surface Ts with the ultraviolet rays by moving the UV irradiator 13 itself to change the area irradiated with the ultraviolet rays. The UV irradiator 13 is configured to be movable in the parallel direction to and the direction that intersects the main sections Ca, Ta of the surfaces Cs, Ts to be supplied with the bonding agent R. Since each of the UV irradiator 13 and the supplier 11 can move in the parallel direction to and the direction that intersects the main sections Ca, Ta of the surfaces Cs, Ts to be supplied with the bonding agent R, a positional relationship between the UV irradiator 13 and the supplier 11 can be switched.

The loading unit 15 is a unit that presses the deformed object T toward the covering object C (applies a force toward the covering object C) to deform the deformed object T. The loading unit 15 is formed as a cuboid in a substantially thick plate shape, and an outer edge of a surface (hereinafter referred to as a "surface 15f") thereof opposing the deformed object T is rounded for an entire periphery. In a plan view (in a state of seeing in a direction facing the surface 15f), the loading unit 15 is formed in the same size as a surface (hereinafter referred to as an "opposing surface Tf") on a back side of the deformed bonding surface Ts of the deformed object T. Except for curvature of the outer edge, the surface 15f of the loading unit 15 matches the opposing surface Tf. The curvature of the outer edge of the surface 15f is the same as the curvature of the covering outer edge Ce of the covering bonding surface Cs. Accordingly, before applying a load in a state where the deformed object T is placed on the surface 15f, the deformed main section Ta comes off the surface 15f.

The holding section 17 is used to fix the covering object C in order to receive the deformed object T at the time when the deformed object T is pressed toward the covering object C by the loading unit 15. The holding section 17 is a cuboid member having a surface in such a size that can encompass the size of the covering object C in the plan view, and is configured to be formed with an inner surface 17f that is dented to accommodate the covering object C therein. The inner surface 17f is formed in such a shape that matches a surface on a back side of the covering bonding surface Cs of the covering object C. The holding section 17 is configured to be able to hold the covering object C, which is accommodated in the inner surface 17f, by means (not illustrated) such as vacuum suction.

The controller 19 is device that controls operation of the bonded object manufacturing apparatus 1. The controller 19 is electrically connected to the supplier 11 in a wired or wireless manner, and is configured to be able to adjust a supply flow rate of the bonding agent R (including the flow rate 0 at a stop of the supply) and to control an amount and a direction of movement of the supplier 11. In addition, the controller 19 is electrically connected to the UV irradiator 13 in the wired or wireless manner, and is configured to be able to adjust presence or absence of irradiation with the ultraviolet rays from the UV irradiator 13 and the intensity of the ultraviolet rays to be emitted therefrom and to control an amount and a direction of movement of the UV irradiator 13. Furthermore, the controller 19 is electrically connected to the loading unit 15 in the wired or wireless manner, and is configured to be able to cause the loading unit 15 to move in a loading direction and an unloading direction. Moreover, the controller 19 is electrically connected to the holding section 17 in the wired or wireless manner, and is configured to be able to switch between a holding state and a non-holding state of the covering object C.

Subsequently, referring to FIG. 3, a description will be made on a method for manufacturing the bonded object E according to the embodiment. FIG. 3 is a flowchart illustrating a manufacturing process of the bonded object E. In this embodiment, as described above, the shape (the radius of curvature) of the rounded portion at the covering outer edge Ce and the shape (the radius of curvature) of the rounded portion at the deformed outer edge Te do not match each other in the surfaces Cs and Ts, on which the covering object C and the deformed object T constituting the bonded object E are bonded. In the case where the shapes of both of the portions match each other, both of the portions can simply be pressed against and bonded to each other with the bonding agent R being interposed therebetween. However, due to limitations on processing and manufacturing technologies of the covering object C and/or the deformed object T, a supply situation of the bonding agent R, and the like, it is difficult in practice to bond these objects by simple pressing. In view of such a circumstance, in this embodiment, a description will be made on the method for manufacturing the bonded object E by appropriately bonding the covering object C and the deformed object T in which the shapes of the surfaces to be bonded do not match. A description will hereinafter be made on the method for manufacturing the bonded object E by using the bonded object manufacturing apparatus 1 (see FIG. 1) that has been described so far. However, the bonded object E may be manufactured by using an apparatus other than the bonded object manufacturing apparatus 1. The following description on the method for manufacturing the bonded object E by using the bonded object manufacturing apparatus 1 also serves as a description on operation of the bonded object manufacturing apparatus 1. In the following description, when the configurations of the bonded object manufacturing apparatus 1 and/or the bonded object E (including the components) are described, FIG. 1 and/or FIG. 2A and/or FIG. 2B will appropriately be referred. In this embodiment, a description will be made on a case where the bonding agent R is supplied to the covering bonding surface Cs.

Once manufacturing of the bonded object E is started, the holding section 17 holds the covering object C (S1). At this time, the covering object C becomes accommodated in the inner surface 17f such that the back side of the covering bonding surface Cs contacts the inner surface 17f. In this way, the covering bonding surface Cs is exposed. Next, the supplier 11 moves along the covering bonding surface Cs while the bonding agent R is discharged from a supply port 11h of the supplier 11, so as to supply the bonding agent R to a required portion of the covering bonding surface Cs (a bonding agent supply step: S2). In this embodiment, since the gel-like bonding agent R is supplied, the bonding agent R closely adheres (supplied without any clearance) to the required portion of the covering bonding surface Cs at the same time as the supply of the bonding agent R to the required portion (a bonding agent close adherence step: S3). In other words, in this embodiment, the bonding agent supply step (S2) and the bonding agent close adherence step (S3) are performed simultaneously.

When the bonding agent R closely adheres to the covering bonding surface Cs, the UV irradiator 13 is used to irradiate the bonding agent R, which has been supplied to the covering bonding surface Cs, with the ultraviolet rays to increase the viscosity of the bonding agent R until the bonding agent R becomes harder than the deformed object T (a thickening step: S4). In addition, the deformed object T, which is placed on the surface 15f of the loading unit 15, is brought close to the covering object C, and the bonding agent R is held between the covering bonding surface Cs and the deformed bonding surface Ts (a bonding agent holding step: S5). In the flowchart illustrated in FIG. 3, the bonding agent holding step (S5) is performed after the thickening step (S4). However, the bonding agent holding step (S5) may be performed before the thickening step (S4), or the thickening step (S4) and the bonding agent holding step (S5) may be performed simultaneously. Here, the placement of the deformed object T on the surface 15f of the loading unit 15 only needs to be completed before the start of the bonding agent holding step (S5).

Next, the loading unit 15 is further brought close to the holding section 17 side, and then a load is applied to the deformed object T to be brought close to the covering object C and the bonding agent R, which has closely adhered thereto, so as to deform the deformed object T (a loading step: S6). At this time, since the covering object C is harder than the deformed object T due to the property of the covering object C, and the bonding agent R, which closely adheres to the covering object C, has been harder than the deformed object T due to the thickening step (S4), the deformed object T is deformed. In particular, the rounded portion in the deformed outer edge Te, whose shape does not match the shape of the covering bonding surface Cs of the covering object C, is deformed. As described, as the deformed object T is deformed, the loading unit 15 approaches the holding section 17 side. As a result, the deformed bonding surface Ts closely adheres to the bonding agent R, which closely adheres to the covering bonding surface Cs. Here, since the bonding agent R fulfills a role of bonding the covering object C and the deformed object T and also fulfills a certain role in the bonded object E, it is desired that the bonding agent R secures the desired thickness. In this embodiment, the bonding agent R, which closely adheres to the covering object C, has been harder than the deformed object T. Accordingly, when the load is applied to the deformed object T, the deformed object T can closely adhere to the bonding agent R while the thickness of the bonding agent R is maintained.

When the deformed bonding surface Ts closely adheres to the bonding agent R, which closely adheres to the covering bonding surface Cs, the UV irradiator 13 is used to further irradiate the bonding agent R with the ultraviolet rays to fix the bonding agent R (a bonding agent fixing step: S7). By this bonding agent fixing step (S7), the viscosity of the bonding agent R is increased to obtain the hardness that is required for the bonded object E as a product. When the bonding agent R is fixed, the loading unit 15 is moved in a direction away from the holding section 17 to remove the load applied to the deformed object T (an unloading step: S8). After the loading unit 15 is retreated, the bonded object E that remains in the holding section 17 is taken out, and then a series of steps for manufacturing the bonded object E is terminated. When the loading unit 15 is retreated, the bonded object E may not remain in the holding section 17, but may be attached to the loading unit 15 and be retreated therewith. The operation of the bonded object manufacturing apparatus 1 that has been described so far is typically controlled by the controller 19.

As it has been described so far, according to the bonded object manufacturing apparatus 1 and the method for manufacturing a bonded object in this embodiment, a load is applied to the deformed object T, which is softer than the covering object C and the bonding agent R, and the deformed object T is brought close to the covering object C and the bonding agent R, which closely adheres to the covering object C, so as to deform the deformed object T. Thus, even in the case where the shapes of the surfaces to be boded of the covering object C and the deformed object T do not match, it is possible to appropriately bond the surfaces to be bonded of the covering object C and the deformed object T and manufacture the bonded object E.

Figure 4:
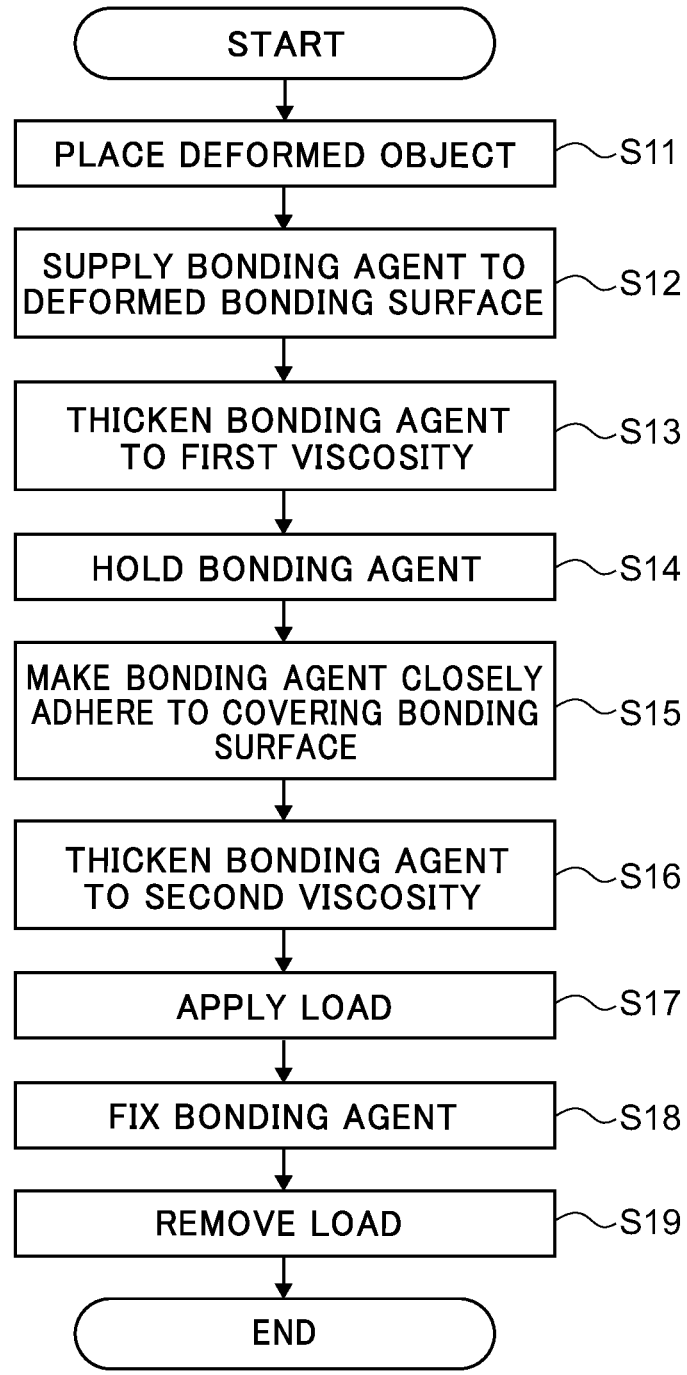
FIG. 4 is a flowchart illustrating a manufacturing process of a method for manufacturing a bonded object according to a modified example of the embodiment.

Next, with reference to FIG. 4, a description will be made on a method for manufacturing the bonded object E according to a modified example of the embodiment. FIG. 4 is a flowchart illustrating a manufacturing process of the bonded object E according to the modified example. Compared to the manufacturing process illustrated in FIG. 3, this modified example differs in a point that the bonding agent R with the fluidity is generally applied to the deformed bonding surface Ts as the bonding agent R is supplied. Accordingly, the order of the steps and the like differ. The method for manufacturing the bonded object E according to this modified example is also typically performed by using the bonded object manufacturing apparatus 1, but may be performed by using an apparatus other than the bonded object manufacturing apparatus 1.

Once the manufacturing of the bonded object E is started, the deformed object T is placed on the surface 15f of the loading unit 15 (S11). At this time, since the shape of the deformed outer edge Te of the opposing surface Tf does not match the shape of the surface 15f of the loading unit 15, a clearance is generated between the deformed main section Ta and the surface 15f of the loading unit 15. Next, the supplier 11 moves along the deformed bonding surface Ts while the bonding agent R is discharged from the supply port 11h of the supplier 11, so as to supply the bonding agent R to the required portion of the deformed bonding surface Ts (a bonding agent supply step: S12). When the bonding agent R is supplied to the deformed bonding surface Ts, the UV irradiator 13 is used to irradiate the bonding agent R, which has been supplied to the deformed bonding surface Ts, with the ultraviolet rays, and the viscosity of the bonding agent is thereby increased to such a degree that the bonding agent R becomes softer than the covering object C but does not flow out by own weight or the like (such viscosity will be referred to as "first viscosity") (a first thickening step: S13). In the first thickening step (S13), the bonding agent R is preferably thickened to such a degree of being spread at the time when another object (typically, the covering object C) is relatively pressed against the deformed bonding surface Ts, to which the bonding agent R has been supplied. In addition, the deformed object T, which is placed on the surface 15f of the loading unit 15, is brought close to the covering object C held by the holding section 17, and the bonding agent R is held between the covering bonding surface Cs and the deformed bonding surface Ts (a bonding agent holding step: S14). In the flowchart illustrated in FIG. 4, the bonding agent holding step (S14) is performed after the first thickening step (S13). However, the bonding agent holding step (S14) may be performed before the first thickening step (S13), or the first thickening step (S13) and the bonding agent holding step (S14) may be performed simultaneously. Here, holding of the covering object C by the holding section 17 only needs to be completed before the start of the bonding agent holding step (S14). In addition, in the bonding agent supply step (S12), in a case where the supplier 11 supplies the bonding agent R in the first viscosity to the deformed bonding surface Ts, the first thickening step (S13) is omitted.

In the bonding agent holding step (S14), the deformed object T, which has been placed on the surface 15f of the loading unit 15, is brought close to the covering object C until the bonding agent R, which has been supplied to the deformed bonding surface Ts, closely adheres to the required portion of the covering bonding surface Cs (the entire covering bonding surface Cs in this modified example). In other words, at the end of the bonding agent holding step (S14), the bonding agent R, which has been applied to the deformed bonding surface Ts, closely adheres to the covering bonding surface Cs (a bonding agent close adherence step: S15). When the bonding agent R closely adheres to the covering bonding surface Cs, the UV irradiator 13 is used to irradiate the bonding agent R, which has been supplied to the covering bonding surface Cs, with the ultraviolet rays, and the viscosity of the bonding agent R is thereby increased until the bonding agent R becomes softer than the covering object C and harder than the deformed object T (such viscosity will be referred to as "second viscosity") (a second thickening step: S16). In the case where the bonding agent R has the second viscosity at a time point that the bonding agent R closely adheres to the covering bonding surface Cs, the second thickening step (S16) is omitted. Next, the loading unit 15 is further brought close to the holding section 17 side, and then a load is applied to the deformed object T to be brought close to the covering object C and the bonding agent R, which has closely adhered thereto, so as to deform the deformed object T (a loading step: S17). Since the bonding agent R is softer than the covering object C and harder than the deformed object T at this time, the deformed object T is deformed the most and the bonding agent R is also deformed as needed, such that the deformed object T and the bonding agent R are fitted to the covering bonding surface Cs of the covering object C. Accordingly, the deformed object T and the bonding agent R can be fitted to the covering object C while the thickness of the bonding agent R is maintained.

When the deformed object T and the bonding agent R are fitted to the covering object C, the UV irradiator 13 is used to further irradiate the bonding agent R with the ultraviolet rays to fix the bonding agent R (a bonding agent fixing step: S18). By this bonding agent fixing step (S18), the viscosity of the bonding agent R is increased to obtain the hardness that is required for the bonded object E as the product. After the bonding agent R is fixed, the loading unit 15 is moved in the direction away from the holding section 17 to remove the load applied to the deformed object T (an unloading step: S19). After the loading unit 15 is retreated, the bonded object E that remains in the holding section 17 is taken out, and then the series of the steps for manufacturing the bonded object E is terminated. When the loading unit 15 is retreated, the bonded object E may not remain in the holding section 17, but may be attached to the loading unit 15 and be retreated therewith.

As it has been described so far, according to the method for manufacturing a bonded object in this modified example, even in the case where the shapes of the surfaces to be bonded of the covering object C and the deformed object T do not match, it is possible to appropriately bond the surfaces to be bonded of the covering object C and the deformed object T after the supply of the bonding agent R to the deformed bonding surface Ts and thus to manufacture the bonded object E.

Figure 5A:
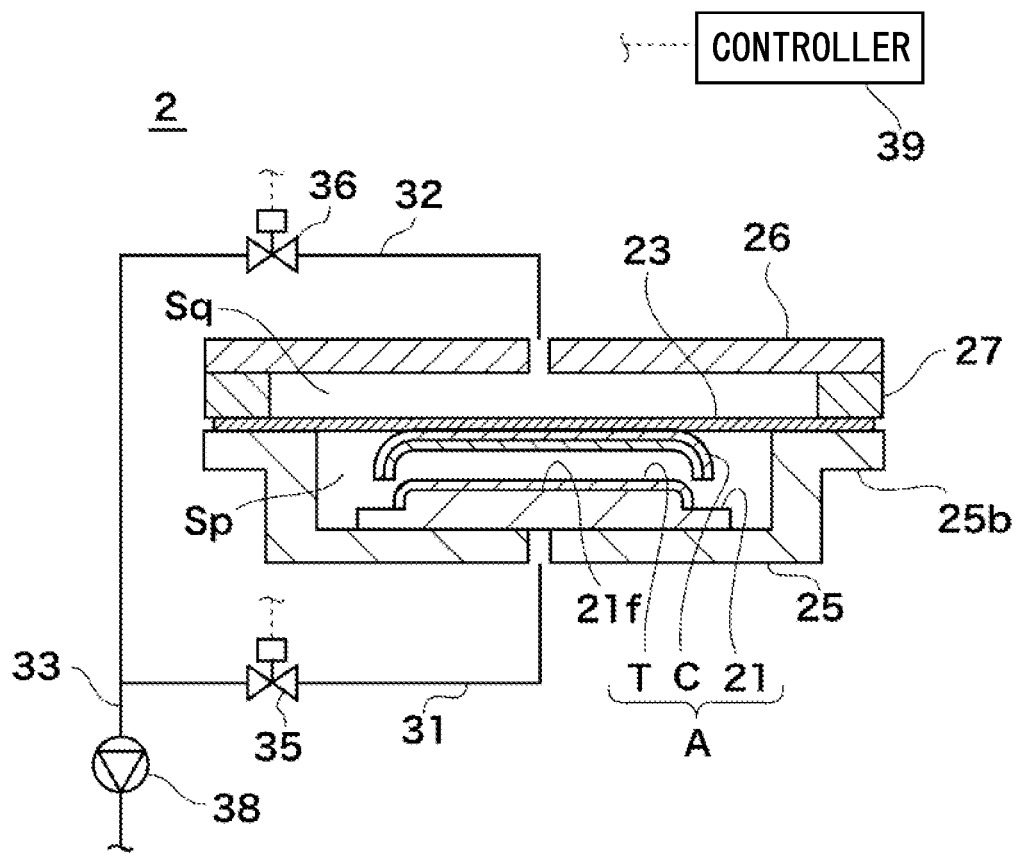
FIG. 5A is a schematic configuration view of a bonded object manufacturing apparatus according to a modified example of the embodiment and illustrates a state where a placement step is completed.
Figure 5B:
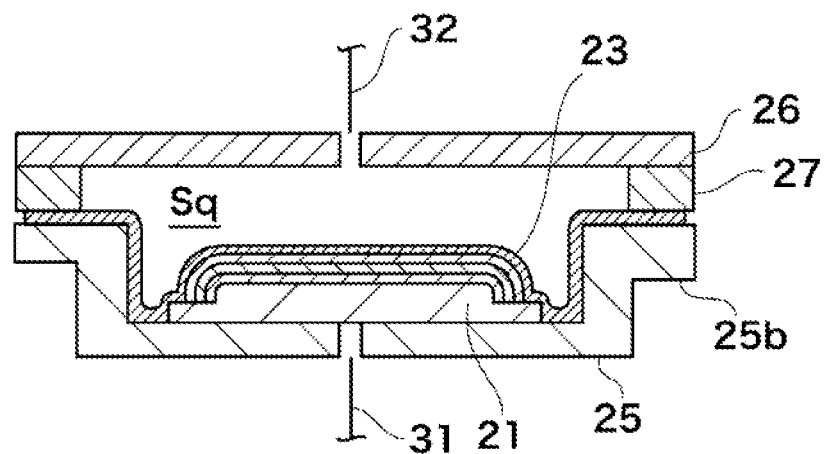
FIG. 5B is a schematic configuration view of the bonded object manufacturing apparatus and illustrates a state where an internal pressure of a non-existence space is higher than that of an existence space.

Next, with reference to FIGS. 5A and 5B, a description will be made on a method for manufacturing a bonded object that is suited when the shape of the covering object C is complex. FIGS. 5A and 5B are schematic configuration views of a bonded object manufacturing apparatus 2 according to another modified example of the embodiment, and the bonded object manufacturing apparatus 2 is an apparatus suited for the method for manufacturing a bonded object described herein. The bonded object manufacturing apparatus 2 includes a base 21 on which the deformed object T is placed, a film 23, an outer frame 25 that accommodates the base 21 and the film 23, a lid 26, and a spacer 27. In the base 21, a surface 21f on which the deformed object T is placed is formed in a similar shape to the surface 15f of the loading unit 15 (see FIG. 1). The base 21 is fixed to a bottom surface of the outer frame 25. The outer frame 25 is configured in a dish shape (a container shape) having a depth that can accommodate the base 21, the deformed object T, and the covering object C. An upper surface of the outer frame 25 is opened, and a brim 25b that extends outward is formed on an entire outer edge of this opening. The lid 26 closes the opened upper surface of the outer frame 25 via the spacer 27. The spacer 27 is configured to have such a size that the spacer 27 contacts the entire brim 25b and have a shape that corresponds to the brim 25b. The lid 26 is made of a plate-shaped member and has such a size that the lid 26 contacts the entire spacer 27. The film 23 is a sheet-like member and has such elasticity that the film 23 is deformed when a predetermined pressure is applied thereto. The film 23 is disposed to be held between the brim 25b and the spacer 27 and partition a space surrounded by the outer frame 25, the spacer 27, and the lid 26. The space surrounded by the outer frame 25, the spacer 27, and the lid 26 is partitioned by the film 23 into an existence space Sp on the base 21 side (a lower side in FIG. 5A) from the film 23 and a non-existence space Sq on an opposite side (an upper side in FIG. 5A and FIG. 5B) of the film 23 from the base 21. The existence space Sp is a space where the base 21, the deformed object T, and the covering object C (these are objects to be closely adhered to later and may also collectively be referred to as an "adhering object A") exist at the time of manufacturing the bonded object, and the non-existence space Sq is a space where the adhering object A does not exist. The lid 26 does not contact the film 23 due to presence of the spacer 27. A thickness of the spacer 27 may be determined according to a size of the non-existence space Sq formed between the film 23 and the lid 26.

One end of a lower pipe 31 that communicates with the existence space Sp is connected to the outer frame 25. The lower pipe 31 can guide gas that is in the existence space Sp to the outside, and functions as an existence space discharge flow path. A lower valve 35 capable of closing the flow path is disposed in the lower pipe 31. One end of an upper pipe 32 that communicates with the non-existence space Sq is connected to the lid 26. The upper pipe 32 can guide gas in the non-existence space Sq to the outside, and functions as a non-existence space discharge flow path. An upper valve 36 capable of closing the flow path is disposed in the upper pipe 32. The other end of the lower pipe 31 and the other end of the upper pipe 32 are connected to one end of a discharge pipe 33. The discharge pipe 33 is a flow path that merges the gas in the lower pipe 31 and the gas in the upper pipe 32 and guides the merged gas to the outside. A vacuum pump 38 is disposed in the discharge pipe 33. The lower valve 35, the upper valve 36, and the vacuum pump 38 are configured that operation thereof is controlled by a controller 39. In other words, the controller 39 is electrically connected to each of the lower valve 35 and the upper valve 36 in the wired or wireless manner, and is configured to be able to separately control opening and closing operation of the lower valve 35 and the upper valve 36 by sending control signals thereto. In addition, the controller 39 is electrically connected to the vacuum pump 38 in the wired or wireless manner, and is configured to be able to control a start and a stop of the vacuum pump 38 by sending a control signal to the vacuum pump 38. The controller 39 is configured to operate the vacuum pump 38 and to control opening and closing of the lower valve 35 and the upper valve 36 and thereby generate a state where internal pressures of the existence space Sp and the non-existence space Sq are equal to each other (see FIG. 5A) and a state where the internal pressure of the non-existence space Sq is higher than that of the existence space Sp (see FIG. 5B). Although not illustrated in FIGS. 5A and 5B, the thus-configured bonded object manufacturing apparatus 2 also includes the supplier 11 (see FIG. 1) and the UV irradiator 13 (see FIG. 1) and is configured that the controller 39 can control the operation thereof in a similar manner to the controller 19 (see FIG. 1). A description will hereinafter be made on a method for, by using the bonded object manufacturing apparatus 2, manufacturing the bonded object E according to another modified example of the embodiment, with reference to FIG. 6.

FIG. 6 is a flowchart illustrating a manufacturing process of the bonded object E according to another modified example. Objects to be bonded in this modified example are the covering object C and the deformed object T described above, and these are bonded via the bonding agent R that is in the gel form when being supplied. In this modified example, first, the bonding agent R is supplied to the required portion of the covering bonding surface Cs in the covering object C (a bonding agent supply step: S21). At the same time as the above, the bonding agent R closely adheres to the required portion of the covering bonding surface Cs (a bonding agent close adherence step: S22). Thereafter, the viscosity of the bonding agent R is increased until the bonding agent R becomes harder than the deformed object T (a thickening step: S23). Contents of the bonding agent supply step (S21), the bonding agent close adherence step (S22), and the thickening step (S23) are respectively the same as the bonding agent supply step (S2), the bonding agent close adherence step (S3), and the thickening step (S4) in the flow illustrated in FIG. 3.

Next, the deformed object T and the covering object C are placed in the existence space Sp (a placement step: S24). The placement step (S24) is performed as follows. First, on the surface 21f of the base 21, the deformed object T is placed with the opposing surface Tf opposing the surface 21f. Next, the covering object C, in which the bonding agent R has been supplied to the covering bonding surface Cs, is placed on the deformed object T such that the bonding agent R opposes the deformed bonding surface Ts. Thereafter, the opening of the outer frame 25 is covered with the film 23, and the spacer 27 and the lid 26 are placed thereon. FIG. 5A illustrates a state where the placement step (S24) is completed. At this time, since the shape of the rounded portion in the deformed outer edge Te does not match the shape of the rounded portion in the covering outer edge Ce, a clearance is formed in most of a portion between the bonding agent R, which has been supplied to the covering bonding surface Cs, and the deformed bonding surface Ts.

After the placement step (S24) is performed, the gas is discharged from both of the existence space Sp and the non-existence space Sq by the vacuum pump 38 to generate a negative pressure of a predetermined degree of vacuum (a negative pressure generation step: S25). The predetermined degree of vacuum is typically a degree of vacuum with which no bubble is produced inside when the covering object C and the deformed object T are bonded together in a later step. This vacuuming creates the same degree of vacuum in the existence space Sp and the non-existence space Sq, and thus maintains an arrangement state of the film 23. Once the existence space Sp and the non-existence space Sq are vacuumed to the predetermined degree of vacuum, the upper valve 36 is closed to stop vacuuming of the non-existence space Sq while continuing vacuuming of the existence space Sp. In this way, a pressure difference is generated such that the pressure in the non-existence space Sq is higher than that in the existence space Sp. By generating this pressure difference, the film 23 is attached tightly to the adhering object A, and a load is applied to the covering object C to be brought close to the deformed object T with a force that further attracts the film 23 on a boundary to the existence space Sp side (a pressure difference generation step/loading step: S26). Since the film 23 is pressed from the non-existence space Sq side to the existence space Sp side, the covering object C is also pressed by the film 23 and brought close to the deformed object T side. Then, the deformed object T, which is softer than the covering object C, the bonding agent R, and the base 21, is deformed. As a result, the deformed bonding surface Ts closely adheres to the bonding agent R, which has closely adhered to the covering bonding surface Cs (see FIG. 5B). This deformation and close adherence mechanism is the same as the loading step (S6) in the flowchart illustrated in FIG. 3. In this modified example, since the existence space Sp is set to the predetermined degree of vacuum before applying the load, it is possible to prevent the bubble from being produced between the surfaces to be bonded. In the pressure difference generation step/loading step (S26), before the deformed bonding surface Ts closely adheres to the bonding agent R, the bonding agent R is held between the covering bonding surface Cs and the deformed bonding surface Ts. Thus, the bonding agent holding step is included in the pressure difference generation step/loading step (S26).

When the deformed bonding surface Ts closely adheres to the bonding agent R, which closely adheres to the covering bonding surface Cs, the bonding agent R is fixed (a bonding agent fixing step: S27). The bonding agent fixing step (S27) herein is the same as the bonding agent fixing step (S7) in the flow illustrated in FIG. 3. Thereafter, the vacuum in the existence space Sp and the non-existence space Sq is broken to remove the load applied to the adhering object A (an unloading step: S28). Thereafter, the lid 26 and the film 23 are removed from the outer frame 25 to take out the bonded object E, and the series of the steps for manufacturing the bonded object E is thereby terminated. In the description in this modified example, in the pressure difference generation step/loading step (S26), the degree of vacuum in the existence space Sp is further increased (the pressure in the existence space Sp is further reduced), and thereby the film 23 closely adheres to the adhering object A. However, conversely, the film 23 may closely adhere to the adhering object A by increasing the pressure in the non-existence space Sq. In addition, the negative pressure is generated in the existence space Sp and the non-existence space Sq (S25) before the pressure difference generation step/loading step (S26). However, in the case where the problem of air bubbles entering between the surfaces to be bonded does not occur, the negative pressure generation step (S25) may not be performed, and in the pressure difference generation step/loading step (S26), a positive pressure may be generated in the non-existence space Sq, so that the film 23 closely adheres to the adhering object A.

In the description that has been made so far, in a mode that the bonding agent R in the form of the gel or having the fluidity is discharged from the supply port 11h of the supplier 11, the bonding agent R is supplied to the covering bonding surface Cs or the deformed bonding surface Ts. However, the bonding agent R may be supplied in a mode that the bonding agent R formed in a sheet shape is disposed to the covering bonding surface Cs or the deformed bonding surface Ts.

The bonding agent R has such a property that the viscosity thereof is increased when the bonding agent R is irradiated with the ultraviolet rays. However, the bonding agent R may have such a property that the viscosity thereof is increased when the bonding agent R is heated (typically of a thermosetting resin). On the contrary, the bonding agent R may have such a property that the viscosity thereof is reduced when the bonding agent R is heated or that the viscosity thereof is increased when the heat is dissipated therefrom (typically of a thermoplastic resin). Just as described, in the case where the bonding agent R has such a property that the viscosity thereof varies by in and out of the heat, a heating unit or the like can be used as a viscosity varying unit.

In the description that has been made so far, the bonding agent R is supplied to either one of the covering object C and the deformed object T. However, the bonding agent R may be supplied to both of the covering object C and the deformed object T, and the bonding agents R supplied to the covering object C and the deformed object T may contact each other when the objects C and T may be brought close to each other and hold the bonding agent R therebetween.

In the description that has been made so far, the bonded object manufacturing apparatus and the method for manufacturing a bonded object according to the embodiments of the present disclosure have been described mainly with reference to each figure as the example. However, the configurations, structures, numbers, arrangements, shapes, materials, and the like of each of the sections are not limited to the above specific example. The components that are appropriately and selectively adopted by the person skilled in the art are included in the scope of the present invention as long as the gist of the present invention is included.

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) is to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

The invention claimed is:

1. A method for manufacturing a bonded object, wherein the bonded object comprises a first object and a second object bonded together via a bonding agent that is capable of changing its viscosity, the first object having a first bonding surface, the second object having a second bonding surface that is bonded to the first bonding surface, the second object being more flexible than the first object, the bonding agent being interposed between the first and second bonding surfaces,
the first object having a first outer edge in which an entire outer edge is raised at one surface side thereof, the second object having a second outer edge in which an entire outer edge is raised at one surface side thereof, the second outer edge being raised at a same side as the side at which the first outer edge is raised when the bonded object is manufactured, and the first object and the second object being configured such that a shape of the first bonding surface at the first outer edge does not match a shape of the second bonding surface at the second outer edge, the method comprising:
supplying the bonding agent to the first bonding surface or the second bonding surface in a manner so as to cover a required portion;
bringing the first and second bonding surfaces close to each other in a manner so as to hold the bonding agent between the first and second bonding surfaces;
making the bonding agent adhere to the required portion of the first bonding surface; and
applying a load to and deforming the second object such that the entire second bonding surface adheres to the bonding agent that adheres to the first bonding surface and is harder than the second object.

2. The method according to claim 1, wherein supplying the bonding agent comprises supplying the bonding agent to the first bonding surface.

3. The method according to claim 1, further comprising:
fixing the bonding agent in a state of adherence to the first and second bonding surfaces before the load applied to the second object is removed.

4. The method according to claim 1, further comprising:
placing the first and second objects in one space in which the first object or the second object contacts a base that is as hard as or harder than the first object, and the first and second objects are not in another space, the one space being next to the other space and being separated from the other space via a sheet-shaped film,
wherein applying the load to and deforming the second object comprises increasing a pressure in the other space to be higher than a pressure in the one space and making the film adhere to an adhering object in which the base, the first object, and the second object are in contact.

5. A bonded object manufacturing apparatus for manufacturing a bonded object, wherein the bonded object comprises a first object and a second object bonded together via a bonding agent that is capable of changing its viscosity, the first object having a first bonding surface, the second object having a second bonding surface that is bonded to the first bonding surface, the second object being more flexible than the first object, the bonding agent being interposed between the first and second bonding surfaces,
the first object having a first outer edge in which an entire outer edge is raised at one surface side thereof, the second object having a second outer edge in which an entire outer edge is raised at one surface side thereof, the second outer edge being raised at a same side as the side at which the first outer edge is raised when the bonded object is manufactured, and the first object and the second object being configured such that a shape of the first bonding surface at the first outer edge does not match a shape of the second bonding surface at the second outer edge, the apparatus comprising:
a bonding agent supplier configured to supply the bonding agent to the first bonding surface or the second bonding surface;
a viscosity varying unit configured to vary a viscosity of the bonding agent; and
a loading unit that has a surface that the second object contacts, wherein an entire outer edge of the surface has a same shape as the first outer edge, and wherein the loading unit is configured to apply a load to and deform the second object such that the entire second bonding surface adheres to the bonding agent that adheres to the first bonding surface and has become harder than the second object.

6. A method for manufacturing a bonded object, wherein the bonded object comprises a first object and a second object bonded together via a bonding agent that is capable of changing its viscosity, the first object having a first bonding surface, the second object having a second bonding surface that is bonded to the first bonding surface, the second object being more flexible than the first object, the bonding agent being interposed between the first and second bonding surfaces, the method comprising:
supplying the bonding agent to the first bonding surface or the second bonding surface in a manner so as to cover a required portion;
bringing the first and second bonding surfaces close to each other in a manner so as to hold the bonding agent between the first and second bonding surfaces;
making the bonding agent adhere to the required portion of the first bonding surface;
applying a load to and deforming the second object against the bonding agent that adheres to the first bonding surface and is harder than the second object; and
placing the first and second objects in one space in which the first object or the second object contacts a base that is as hard as or harder than the first object, and the first and second objects are not in another space, the one space being next to the other space and being separated from the other space via a sheet-shaped film, wherein applying the load to and deforming the second object comprises increasing a pressure in the other space to be higher than a pressure in the one space and making the film adhere to an adhering object in which the base, the first object, and the second object are in contact.

7. A bonded object manufacturing apparatus for manufacturing a bonded object, wherein the bonded object comprises a first object and a second object bonded together via a bonding agent that is capable of changing its viscosity, the first object having a first bonding surface, the second object having a second bonding surface that is bonded to the first bonding surface, the second object being more flexible than the first object, the bonding agent being interposed between the first and second bonding surfaces, the apparatus comprising:

a bonding agent supplier configured to supply the bonding agent to the first bonding surface or the second bonding surface;

a viscosity varying unit configured to vary a viscosity of the bonding agent;

a loading unit configured to apply a load to and deform the second object against the bonding agent that adheres to the first bonding surface and has become harder than the second object;

an outer frame configured to accommodate the loading unit and the first and second objects, the outer frame being formed with an opening;

a lid configured to close the opening of the outer frame via a spacer;

a sheet-shaped film that partitions a space surrounded by the outer frame, the spacer, and the lid into one space and another space, wherein the loading unit, the first object, and the second object are in the one space and are not in the other space;

a one space discharge flow path configured to guide gas in the one space to outside, a first control valve capable of closing the one space discharge flow path being disposed in the one space discharge flow path;

another space discharge flow path configured to guide gas in the other space to the outside, a second control valve capable of closing the other space discharge flow path being disposed in the other space discharge flow path;

a vacuum pump configured to discharge the gas in the one space and the other space via the one space discharge flow path and the other space discharge flow path, respectively; and a controller configured to control the first control valve, the second control valve, and the vacuum pump to increase a pressure in the other space to be higher than a pressure in the one space and thereby make the film adhere to an adhering object in which the loading unit, the first object, and the second object are in contact.

* * * * *